United States Patent
Yang et al.

(10) Patent No.: US 12,408,075 B2
(45) Date of Patent: Sep. 2, 2025

(54) SYSTEMS AND METHODS FOR PROVIDING A ROBUST SINGLE CARRIER RADIO ACCESS NETWORK LINK

(71) Applicant: Verizon Patent and Licensing Inc., Basking Ridge, NJ (US)

(72) Inventors: Jin Yang, Orinda, CA (US); Susan Wu Sanders, Bridgewater, NJ (US); Xin Wang, Morris Plains, NJ (US); Sudhir Patel, Boonton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 374 days.

(21) Appl. No.: 18/161,958

(22) Filed: Jan. 31, 2023

(65) Prior Publication Data
US 2024/0259872 A1   Aug. 1, 2024

(51) Int. Cl.
*H04W 72/04* (2023.01)
*H04L 1/08* (2006.01)
*H04W 28/06* (2009.01)

(52) U.S. Cl.
CPC ............. *H04W 28/065* (2013.01); *H04L 1/08* (2013.01)

(58) Field of Classification Search
CPC .. H04L 1/08; H04W 28/065; H04W 72/0453; H04W 72/51
See application file for complete search history.

(56) References Cited

U.S. PATENT DOCUMENTS

2017/0325205 A1* 11/2017 Zhou ............... H04W 72/21

FOREIGN PATENT DOCUMENTS

WO   WO-2024210977 A1 * 10/2024 ......... H04L 27/2603

* cited by examiner

*Primary Examiner* — Phuc H Tran

(57) ABSTRACT

A network device may determine that a user equipment is entering a first frequency band coverage area provided by the network device and may determine that the user equipment is a power sensitive device or a narrow band device. The network device may receive multiple carrier information associated with the network device based on determining that the user equipment is a power sensitive device or a narrow band device. The network device may process the multiple carrier information, with a machine learning model, to determine a quantity of repetitions to extend uplink coverage for the user equipment and may enable the quantity of repetitions to extend the uplink coverage for the user equipment.

20 Claims, 7 Drawing Sheets

SYSTEMS AND METHODS FOR PROVIDING A ROBUST SINGLE CARRIER RADIO ACCESS NETWORK LINK

BACKGROUND

Multiple carrier aggregation and dual connectivity may improve radio access network (RAN) coverage, RAN link robustness, and capacity for user equipment (UE), such as enhanced mobile broadband (eMBB) devices.

DETAILED DESCRIPTION OF EXAMPLE EMBODIMENTS

Figure 1A:
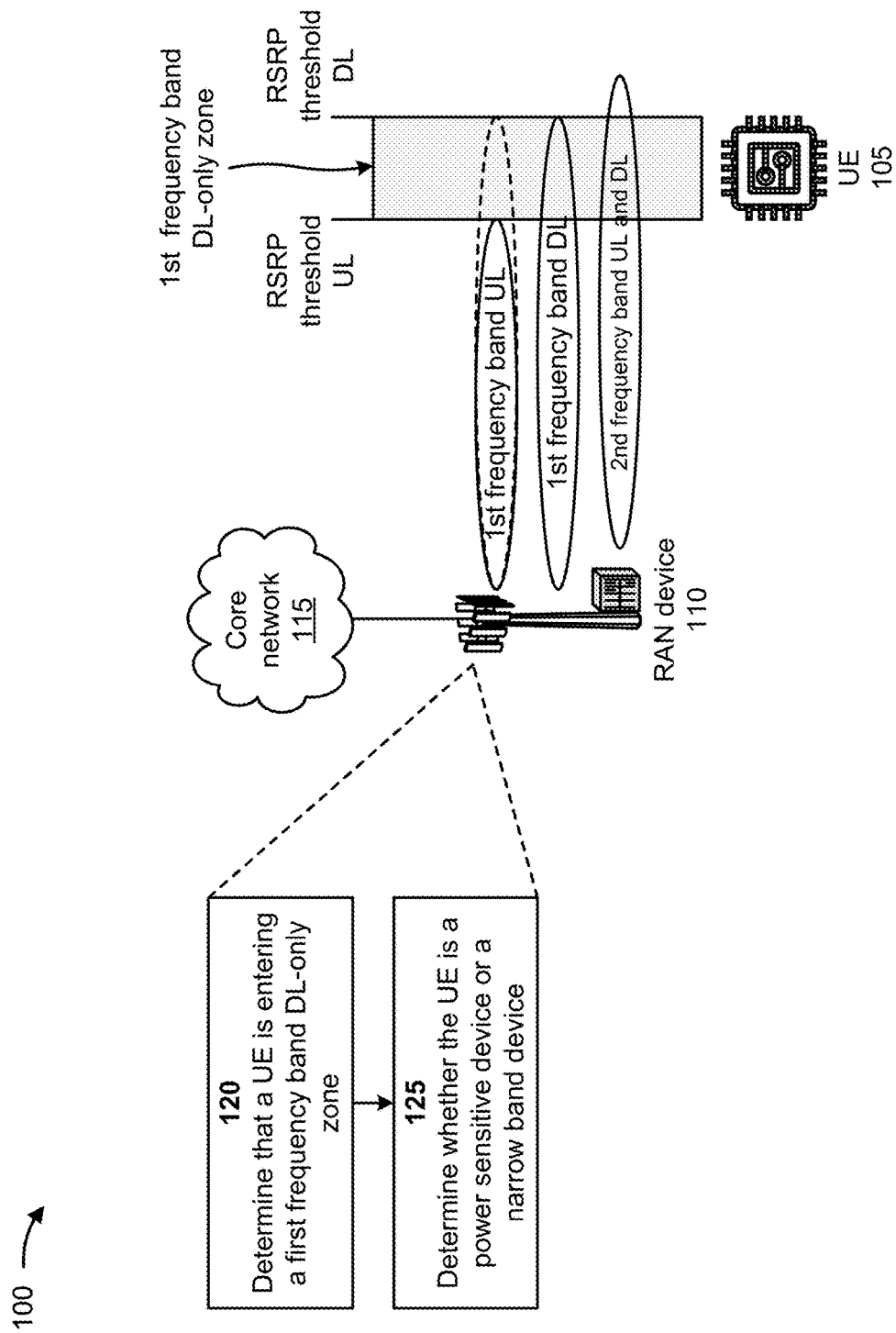
FIGS. 1A-1C are diagrams of an example associated with providing a robust single carrier RAN link for power sensitive or low data rate UEs.

The following detailed description of example implementations refers to the accompanying drawings. The same reference numbers in different drawings may identify the same or similar elements.

Multiple carrier aggregation is a technique that increases a data rate per UE, whereby multiple frequency blocks (e.g., called component carriers) are assigned to the same UE. A maximum possible data rate for a UE may be increased as more frequency blocks are assigned to the UE. A sum data rate of a RAN may be increased as well because of better resource utilization. In addition, load balancing is possible with multiple carrier aggregation. Dual connectivity is a feature that allows UEs to utilize frequencies from different carrier bands, (e.g., both mid-band and millimeter wave (mmWave) frequencies or fourth-generation (4G) and fifth-generation (5G) frequencies) to provide improved RAN coverage and data rate. This is done by implementing multiple carrier aggregation which allows network providers to combine two or more carriers into a single data channel to increase a capacity of the RAN and the data rates. However, some RANs implement a single carrier bandwidth for power sensitive or low data rate UEs (e.g., Internet of Things (IoT) devices), making multiple carrier aggregation and dual connectivity impossible for those UEs.

Thus, RANs implementing a single carrier bandwidth may consume computing resources (e.g., processing resources, memory resources, communication resources, and/or the like), networking resources, and/or other resources associated with failing to provide improved RAN coverage and data rates for power sensitive or low data rate UEs, failing to provide improved RAN link robustness for power sensitive or low data rate UEs, failing to provide improved capacity for power sensitive or low data rate UEs, and/or the like.

Some implementations described herein provide a network device (e.g., a RAN device) that provides a robust single carrier RAN link for power sensitive or low data rate UEs. For example, the RAN device may determine that a UE is entering a first frequency band coverage area provided by the RAN device and may determine that the UE is a power sensitive device or a narrow band device. The RAN device may receive multiple carrier information associated with the RAN device based on determining that the UE is a power sensitive device or a narrow band device. The RAN device may process the multiple carrier information, with a machine learning model, to determine a quantity of repetitions to extend uplink coverage for the UE, to determine how to reduce a modulation coding scheme (MCS) to enhance uplink robustness for the UE, and/or to determine how to reduce a block error rate (BLER) to enhance uplink robustness for the UE. The RAN device may enable the quantity of repetitions to extend the uplink coverage for the UE, may reduce the MCS to enhance the uplink robustness for the UE based on determining how to reduce the MCS, and/or may reduce the BLER to enhance the uplink robustness for the UE based on determining how to reduce the BLER.

In this way, the RAN device provides a robust single carrier RAN link for power sensitive or low data rate UEs. For example, the RAN device may include a single carrier robust RAN mechanism that utilizes a machine learning model trained with multiple carrier information associated with the RAN device. The RAN device may trigger a single carrier based on a type of UE and a type of service provided to the UE. For a particular UE (e.g., a power sensitive or low data rate UE, without the ability to utilize multiple carrier aggregation and dual connectivity), the RAN device may utilize the machine learning model to determine a quantity of repetition and slot aggregation with the single carrier to extend uplink (UL) coverage for the particular UE. The RAN device may utilize the machine learning model to determine a reduced MCS matching to enhance uplink robustness for the particular UE. The RAN device may utilize the machine learning model to determine a reduced BLER to enhance uplink robustness for the particular UE. Thus, the RAN device may conserve computing resources, networking resources, and/or other resources that would have otherwise been consumed by failing to provide improved RAN coverage and data rates for power sensitive or low data rate UEs, failing to provide improved RAN link robustness for power sensitive or low data rate UEs, failing to provide improved capacity for power sensitive or low data rate UEs, and/or the like.

Figure 1B:
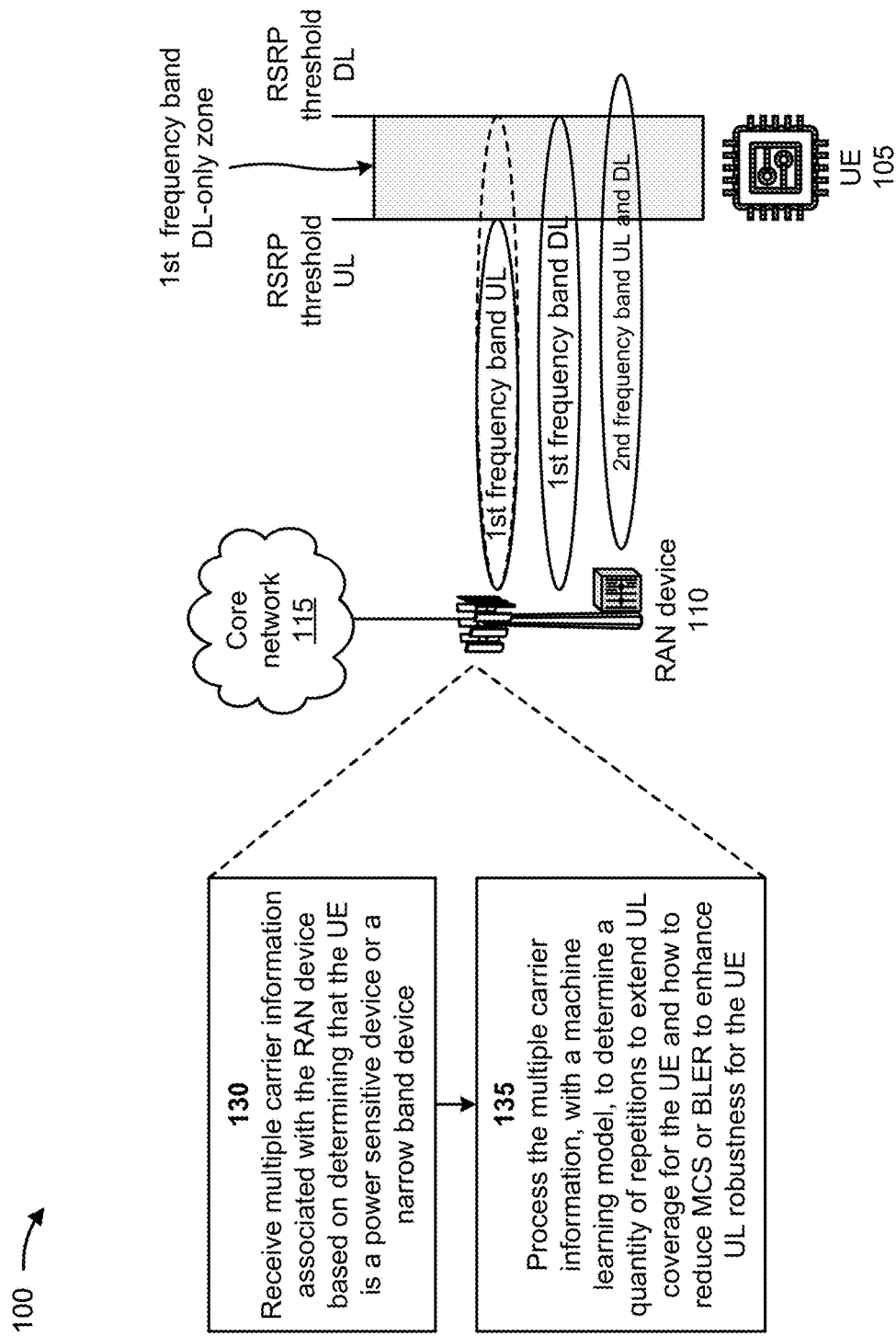
Figure 1C:
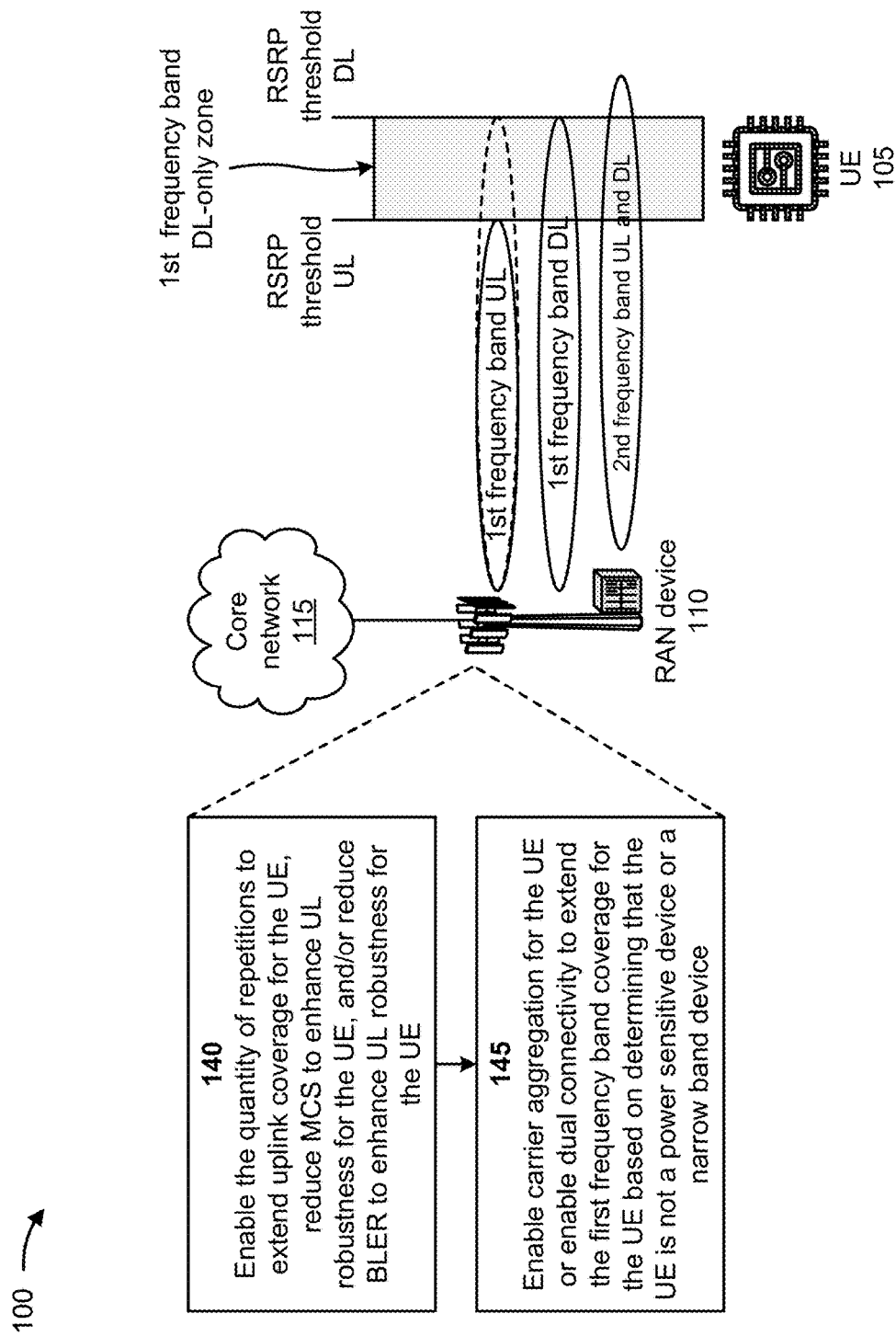

FIGS. 1A-1C are diagrams of an example 100 associated with providing a robust single carrier RAN link for power sensitive or low data rate UEs. As shown in FIGS. 1A-1C, example 100 includes a UE 105, a RAN device 110, and a core network 115. Further details of the UE 105, the RAN device 110, and the core network 115 are provided elsewhere herein.

Although FIGS. 1A-1C depict the n77, n5, and B5 frequency bands, implementations described herein may be utilized with other frequency bands. For example, an n48 frequency band may be utilized as a New Radio (NR) time division duplexing (TDD) frequency band; an n2 frequency band or an n66 frequency band may be utilized as NR frequency division duplexing (FDD) frequency bands; B13, B66, or B2 frequency bands may be utilized; an n41 frequency band may be utilized, an n71 frequency band may be utilized; and/or the like. Although a low frequency band (e.g., the n5 frequency band or the B5 frequency band) typically provides wider coverage, in a non-collocated deployment other frequency bands may be utilized to achieve coverage and capacity benefits (e.g., a non-collocated B66 frequency band may utilized as an anchor and may include dual connectivity with the n77 frequency band.

As shown in FIG. 1A, and by reference number 120, the RAN device 110 may determine that the UE 105 is entering a first frequency band downlink (DL) only zone provided by the RAN device 110. For example, the RAN device 110 may generate a first frequency band that provides a downlink-only zone. In an example implementation, the first frequency band may include a 3.7 gigahertz (GHz) 5G frequency band (e.g., the n77 frequency band) that is defined by a reference signal received power (RSRP) threshold uplink and an RSRP threshold downlink. When the UE 105 enters (or is approaching) the zone created by the first frequency band, the UE 105 may provide a signal to the RAN device 110. The RAN device 110 may receive the signal from the UE 105 and may determine that the UE 105 is entering the first frequency band downlink-only zone based on the signal.

As further shown in FIG. 1A, and by reference number 125, the RAN device 110 may determine whether the UE 105 is a power sensitive device or a narrow band device. For example, when the UE 105 enters the first frequency band coverage area provided by the RAN device 110, the UE 105 and the RAN device 110 may conduct a registration process for registering the UE 105 with the RAN device 110. During the registration process, the UE 105 may provide, to the RAN device 110, capability information that identifies capabilities of the UE 105, such as whether the UE 105 is a power sensitive device (e.g., an IoT device), whether the UE 105 is not a power sensitive device (e.g., a mobile telephone), whether the UE 105 is a narrow band device, whether the UE 105 is not a narrow band device, and/or the like. In some implementations, the capability information may include frequency band combination information elements indicating whether the UE 105 is capable of multiple carrier aggregation and/or dual connectivity. The RAN device 110 may determine whether the UE 105 is a power sensitive device or a narrow band device based on the capability information. In some implementations, the RAN device 110 may determine that the UE 105 is a power sensitive device or a narrow band device. Alternatively, the RAN device 110 may determine that the UE 105 is not a power sensitive device or a narrow band device.

As shown in FIG. 1B, and by reference number 130, the RAN device 110 may receive multiple carrier information associated with the RAN device 110 based on determining that the UE 105 is a power sensitive device or a narrow band device. For example, when the RAN device 110 determines that the UE 105 is a power sensitive device or a narrow band device, the RAN device 110 may receive the multiple carrier information associated with the RAN device 110. The multiple carrier information may include information identifying available component carriers (e.g., frequency blocks), bandwidths of the component carriers, a quantity of component carriers that may be aggregated, and/or the like. In some implementations, the RAN device 110 may monitor the multiple carrier information over time, and may store the multiple carrier information in a data structure (e.g., a database, a table, a list, and/or the like) associated with the RAN device 110. In such implementations, the RAN device 110 may receive the multiple carrier information from the data structure when the RAN device 110 determines that the UE 105 is a power sensitive device or a narrow band device.

As further shown in FIG. 1B, and by reference number 135, the RAN device 110 may process the multiple carrier information, with a machine learning model, to determine a quantity of repetitions to extend uplink (UL) coverage for the UE 105 and how to reduce MCS or BLER to enhance UL robustness for the UE 105. For example, the RAN device 110 may include or have access to a machine learning model. In some implementations, the machine learning model may include a neural network model, such as an artificial neural network (ANN) model, a convolution neural network (CNN) model, or a recurrent neural network (RNN) model. The RAN device 110 may train the machine learning model, may receive a trained machine learning model, may update the machine learning model, may provide information for updating the machine learning model to another device that updates the machine learning model, and/or the like. Further details of training the machine learning model are described below in connection with FIG. 2.

In some implementations, the RAN device 110 may process the multiple carrier information, with the machine learning model, to determine a quantity of repetitions or slot aggregation to provide so that the RAN device 110 may extend uplink coverage for the UE 105. As shown in FIG. 1B, the quantity of repetitions or the slot aggregation may extend the uplink coverage (e.g., for the n77 frequency band) from the coverage indicated by the solid line oval to the coverage indicated by the dashed line oval. The extended uplink coverage may encompass the entire n77 downlink-only zone provided by the RAN device 110.

Alternatively, or additionally, the RAN device 110 may process the multiple carrier information, with the machine learning model, to determine how to reduce MCS so that UL robustness may be enhanced for the UE 105. MCS defines a quantity of useful bits that can be carried by one symbol (e.g., a resource element) or a quantity of useful bits that can be transmitted per resource element. MCS depends on radio signal quality in a wireless link, where a higher quality radio signal provides a higher MCS (e.g., more useful bits can be transmitted by a symbol) and a lower quality radio signal result in a lower MCS (e.g., less useful bits can be transmitted by a symbol). Thus, the machine learning model may determine how to reduce the MCS for the downlink-only zone so that uplink robustness may be enhanced for the UE 105.

Alternatively, or additionally, the RAN device 110 may process the multiple carrier information, with the machine learning model, to determine how to reduce BLER so that UL robustness may be enhanced for the UE 105. BLER is a decoding failure rate of transport blocks (e.g., data blocks). A greater BLER results in more data blocks experiencing decoding failure and a lower BLER results in less data blocks experiencing decoding failure. Thus, the machine learning model may determine how to reduce the BLER for the downlink-only zone so that uplink robustness may be enhanced for the UE 105.

As shown in FIG. 1C, and by reference number 140, the RAN device 110 may enable the quantity of repetitions to extend uplink coverage for the UE 105, may reduce MCS to enhance UL robustness for the UE 105, and/or may reduce BLER to enhance UL robustness for the UE 105. For example, the RAN device 110 may enable the quantity of repetitions or the slot aggregation to extend the uplink coverage (e.g., for the n77 frequency band) for the UE 105 from the solid line oval to the dashed line oval. Alternatively, or additionally, the RAN device 110 may reduce the MCS for the downlink-only zone so that uplink robustness may be enhanced for the UE 105. Alternatively, or additionally, the RAN device 110 may reduce the BLER for the downlink-only zone so that uplink robustness may be enhanced for the UE 105. In some implementations, the RAN device 110 may perform various combinations of the aforementioned functions (e.g., enable the quantity of repetitions or the slot aggregation, reduce the MCS, and reduce the BLER).

As further shown in FIG. 1C, and by reference number 145, the RAN device 110 may enable carrier aggregation with a second frequency band (e.g., an n5 frequency band) and the first frequency band (e.g., the n77 frequency band), for the UE 105, or may enable dual connectivity, for a third frequency band (e.g., a B5 frequency band) and the first frequency band (e.g., the n77 frequency band), to extend the first frequency band (e.g., the n77 frequency band) coverage for the UE 105 based on determining that the UE 105 is not a power sensitive device or a narrow band device. For example, when the RAN device 110 determines that the UE 105 is not a power sensitive device or a narrow band device, the RAN device 110 may enable, for the UE 105, carrier aggregation with the second frequency band and the first frequency band. In some implementations, the second frequency band may include an eight hundred and fifty (850) megahertz (MHz) 5G frequency band.

Alternatively, when the RAN device 110 determines that the UE 105 is not a power sensitive device or a narrow band device, the RAN device 110 may enable dual connectivity, for the third frequency band and the first frequency band, to extend coverage of the first frequency band for the UE 105. In some implementations, the third frequency band may include an eight hundred and fifty (850) MHz 4G frequency band.

In this way, the RAN device 110 provides a robust single carrier RAN link for power sensitive or low data rate UEs 105. For example, the RAN device 110 may include a single carrier robust RAN mechanism that utilizes a machine learning model trained with multiple carrier information associated with the RAN device 110. The RAN device 110 may trigger a single carrier based on a type of UE 105 and a type of service provided to the UE 105. For a particular UE 105 (e.g., a power sensitive or low data rate UE 105, without the ability to utilize multiple carrier aggregation and dual connectivity), the RAN device 110 may utilize the machine learning model to determine a quantity of repetition and slot aggregation with the single carrier to extend uplink coverage for the particular UE 105. The RAN device 110 may utilize the machine learning model to determine a reduced MCS matching to enhance uplink robustness for the particular UE 105. The RAN device 110 may utilize the machine learning model to determine a reduced BLER to enhance uplink robustness for the particular UE 105. Thus, the RAN device 110 may conserve computing resources, networking resources, and/or other resources that would have otherwise been consumed by failing to provide improved RAN coverage and data rates for power sensitive or low data rate UEs 105, failing to provide improved RAN link robustness for power sensitive or low data rate UEs 105, failing to provide improved capacity for power sensitive or low data rate UEs 105, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
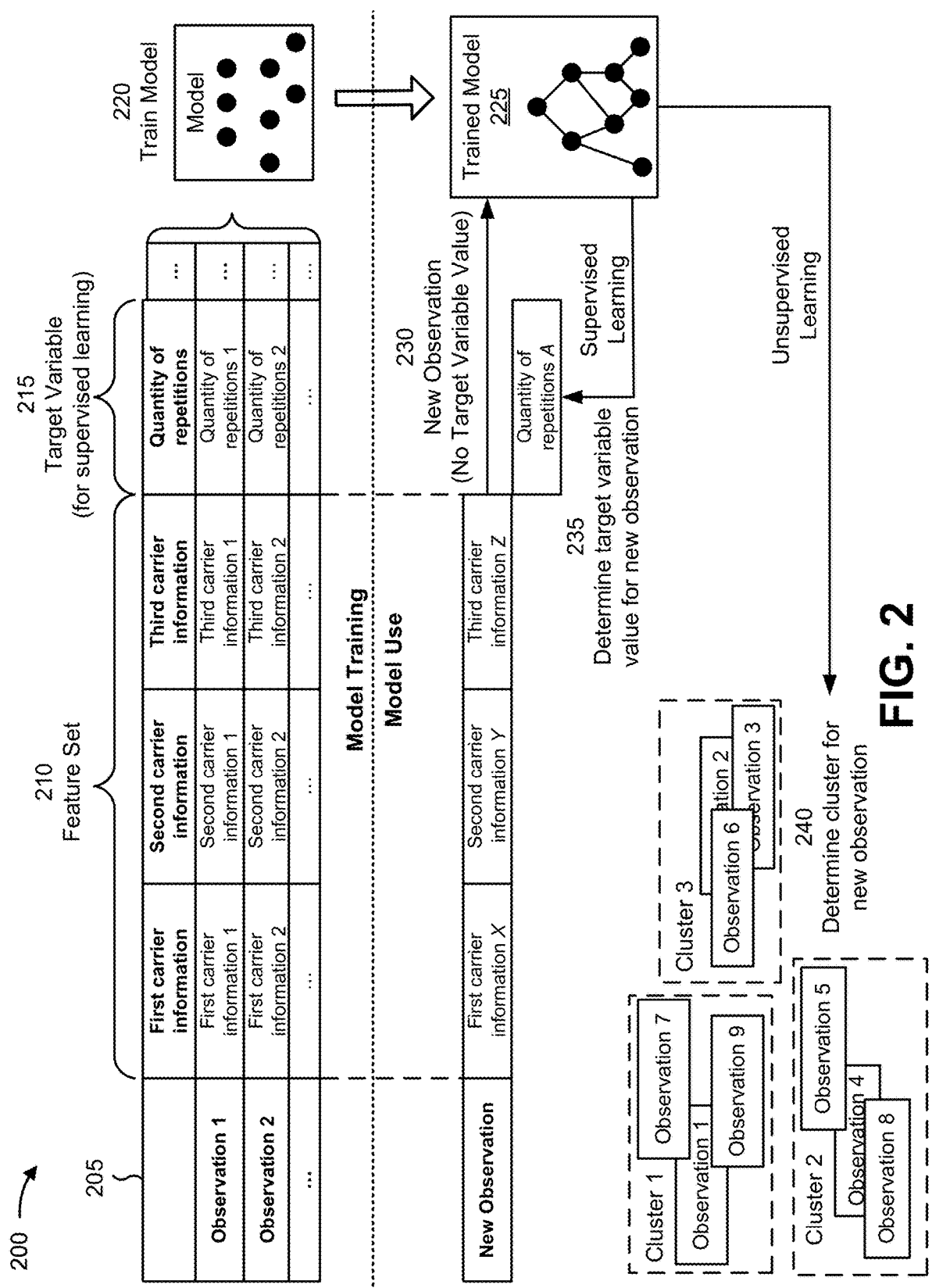
FIG. 2 is a diagram illustrating an example of training and using a machine learning model.

FIG. 2 is a diagram illustrating an example 200 of training and using a machine learning model in connection with systems and methods for providing a robust single carrier RAN link for power sensitive or low data rate UEs. The machine learning model training and usage described herein may be performed using a machine learning system. The machine learning system may include or may be included in a computing device, a server, a cloud computing environment, or the like, such as the RAN device 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the RAN device 110, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the RAN device 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of first carrier information, a second feature of second carrier information, a third feature of third carrier information, and so on. As shown, for a first observation, the first feature may have a value of first carrier information 1, the second feature may have a value of second carrier information 1, the third feature may have a value of third carrier information 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a quantity of repetitions, which has a value of quantity of repetitions 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first carrier information X, a second feature of second carrier information Y, a third feature of third carrier information Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of quantity of repetitions A for the target variable of the quantity of repetitions for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first carrier information cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second carrier information cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to provide a robust single carrier RAN link for power sensitive or low data rate UEs. The machine learning system may enable recognition and/or identification of tens, hundreds, thousands, or millions of features and/or feature values for tens, hundreds, thousands, or millions of observations, thereby increasing accuracy and consistency and reducing delay associated with providing a robust single carrier RAN link for power sensitive or low data rate UEs relative to requiring computing resources to be allocated for tens, hundreds, or thousands of operators to manually provide a robust single carrier RAN link for power sensitive or low data rate UEs using the features or feature values.

As indicated above, FIG. 2 is provided as an example. Other examples may differ from what is described in connection with FIG. 2.

Figure 3:
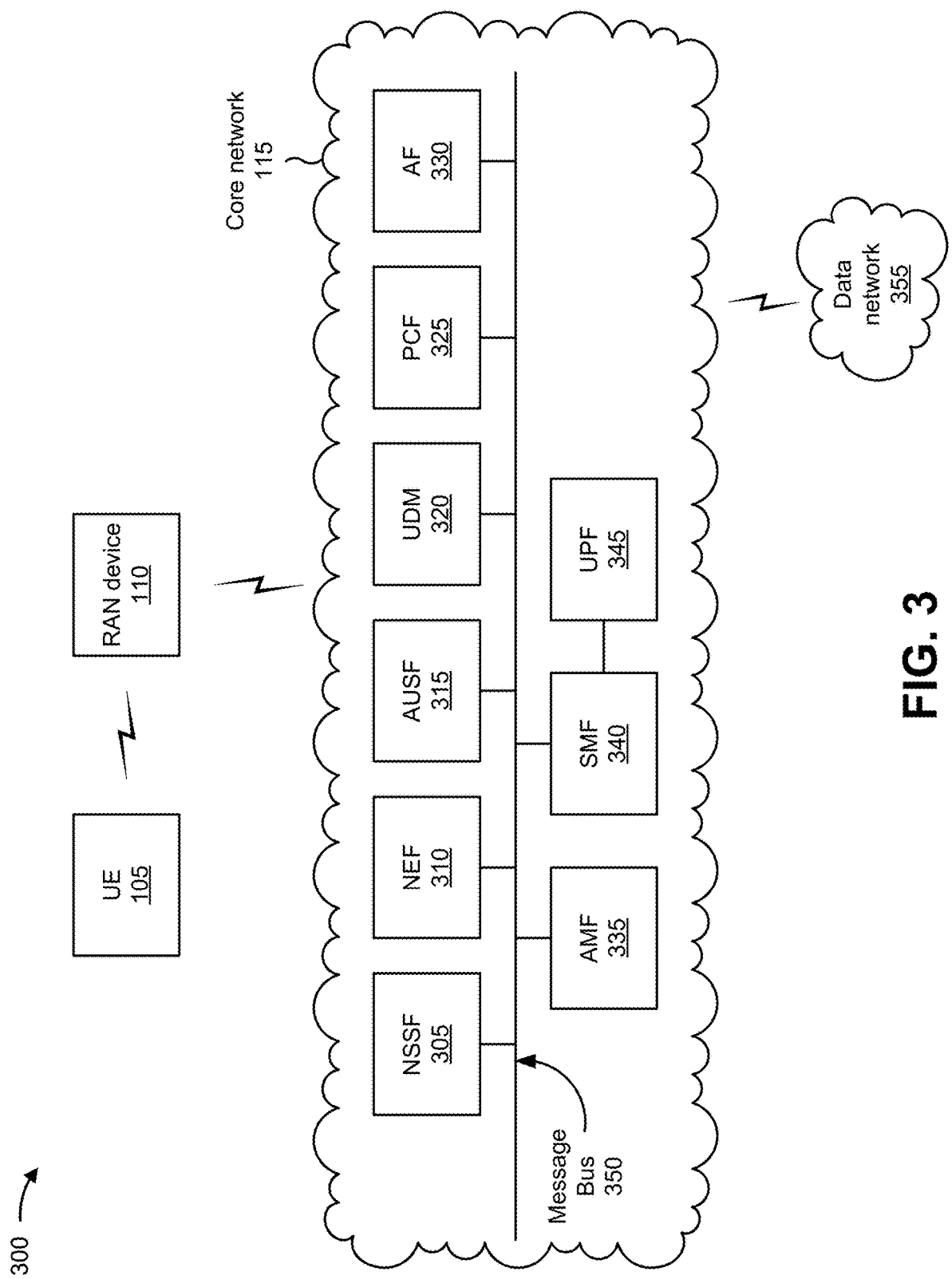
FIG. 3 is a diagram of an example environment in which systems and/or methods described herein may be implemented.

FIG. 3 is a diagram of an example environment 300 in which systems and/or methods described herein may be implemented. As shown in FIG. 3, the example environment 300 may include the UE 105, the RAN device 110, the core network 115, and a data network 355. Devices and/or networks of the example environment 300 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN device 110 may support, for example, a cellular radio access technology (RAT). The RAN device 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN device 110 may transfer traffic between the UE 105 (e.g., using a cellular RAT), one or more base stations (e.g., using a wireless interface or a backhaul interface, such as a wired backhaul interface), and/or the core network 115. The RAN device 110 may provide one or more cells that cover geographic areas.

In some implementations, the RAN device 110 may perform scheduling and/or resource management for the UE 105 covered by the RAN device 110 (e.g., the UE 105 covered by a cell provided by the RAN device 110). In some implementations, the RAN device 110 may be controlled or coordinated by a network controller, which may perform load balancing, network-level configuration, and/or other operations. The network controller may communicate with the RAN device 110 via a wireless or wireline backhaul. In some implementations, the RAN device 110 may include a network controller, a self-organizing network (SON) module or component, or a similar module or component. In other words, the RAN device 110 may perform network control, scheduling, and/or network management functions (e.g., for uplink, downlink, and/or sidelink communications of the UE 105 covered by the RAN device 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 3 may be an example of a service-based architecture, in some implementations, the core network 115 may be implemented as a reference-point architecture and/or a 4G core network, among other examples.

As shown in FIG. 3, the core network 115 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 305 includes one or more devices that select network slice instances for the UE 105. By providing network slicing, the NSSF 305 allows an operator to deploy multiple substantially independent end-to-end networks potentially with the same infrastructure. In some implementations, each slice may be customized for different services.

The NEF 310 includes one or more devices that support exposure of capabilities and/or events in the wireless telecommunications system to help other entities in the wireless telecommunications system discover network services.

The AUSF 315 includes one or more devices that act as an authentication server and support the process of authenticating the UE 105 in the wireless telecommunications system.

The UDM 320 includes one or more devices that store user data and profiles in the wireless telecommunications system. The UDM 320 may be used for fixed access and/or mobile access in the core network 115.

The PCF 325 includes one or more devices that provide a policy framework that incorporates network slicing, roaming, packet processing, and/or mobility management, among other examples.

The AF 330 includes one or more devices that support application influence on traffic routing, access to the NEF 310, and/or policy control, among other examples.

The AMF 335 includes one or more devices that act as a termination point for non-access stratum (NAS) signaling and/or mobility management, among other examples.

The SMF 340 includes one or more devices that support the establishment, modification, and release of communication sessions in the wireless telecommunications system. For example, the SMF 340 may configure traffic steering policies at the UPF 345 and/or may enforce user equipment IP address allocation and policies, among other examples.

The UPF 345 includes one or more devices that serve as an anchor point for intraRAT and/or interRAT mobility. The UPF 345 may apply rules to packets, such as rules pertaining to packet routing, traffic reporting, and/or handling user plane QoS, among other examples.

The message bus 350 represents a communication structure for communication among the functional elements. In other words, the message bus 350 may permit communication between two or more functional elements.

The data network 355 includes one or more wired and/or wireless data networks. For example, the data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 300 may perform one or more functions described as being performed by another set of devices of the example environment 300.

Figure 4:
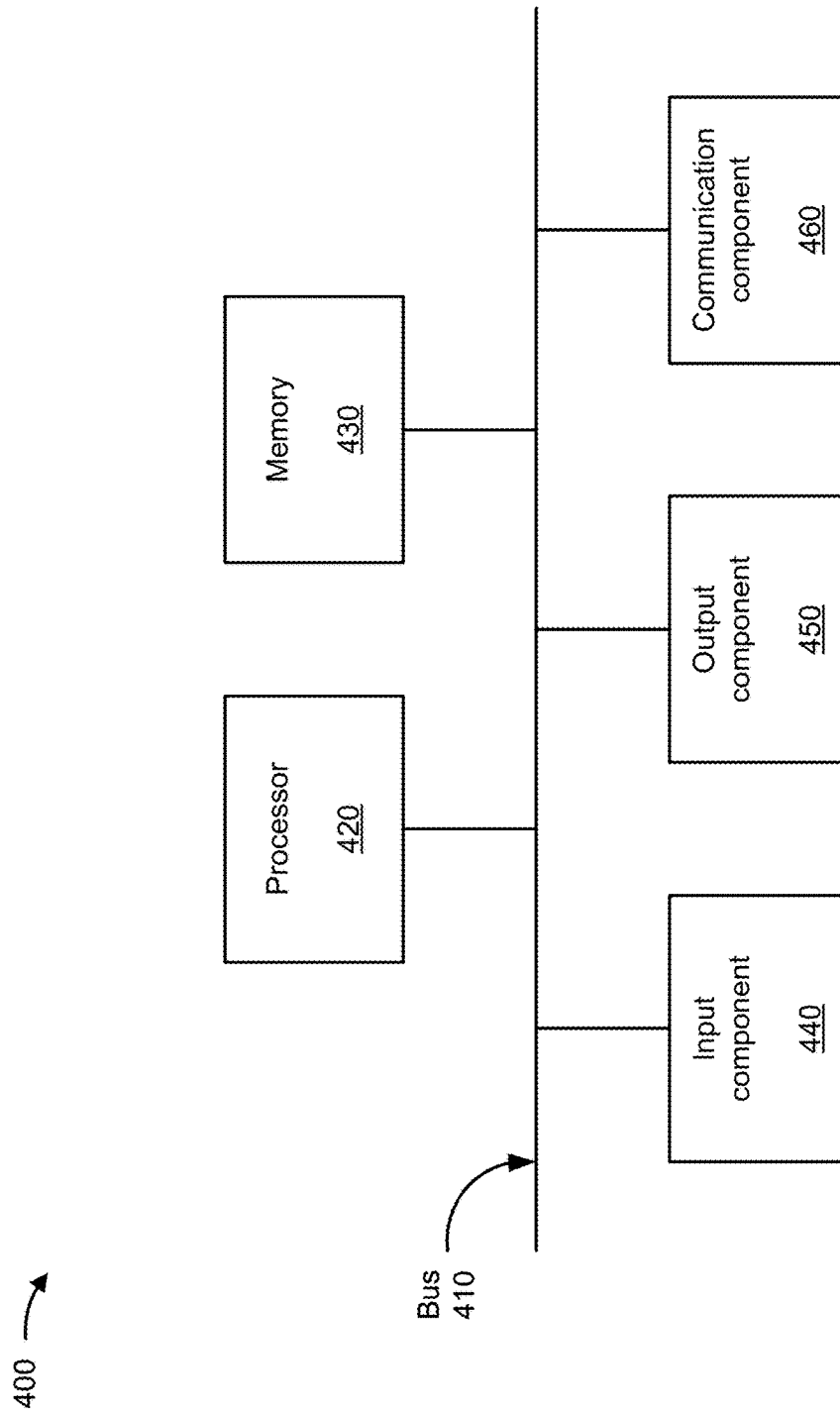
FIG. 4 is a diagram of example components of one or more devices of FIG. 3.

FIG. 4 is a diagram of example components of a device 400, which may correspond to the UE 105, the RAN device 110, the NSSF 305, the NEF 310, the AUSF 315, the UDM 320, the PCF 325, the AF 330, the AMF 335, the SMF 340, and/or the UPF 345. In some implementations, the UE 105, the RAN device 110, the NSSF 305, the NEF 310, the AUSF 315, the UDM 320, the PCF 325, the AF 330, the AMF 335, the SMF 340, and/or the UPF 345 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
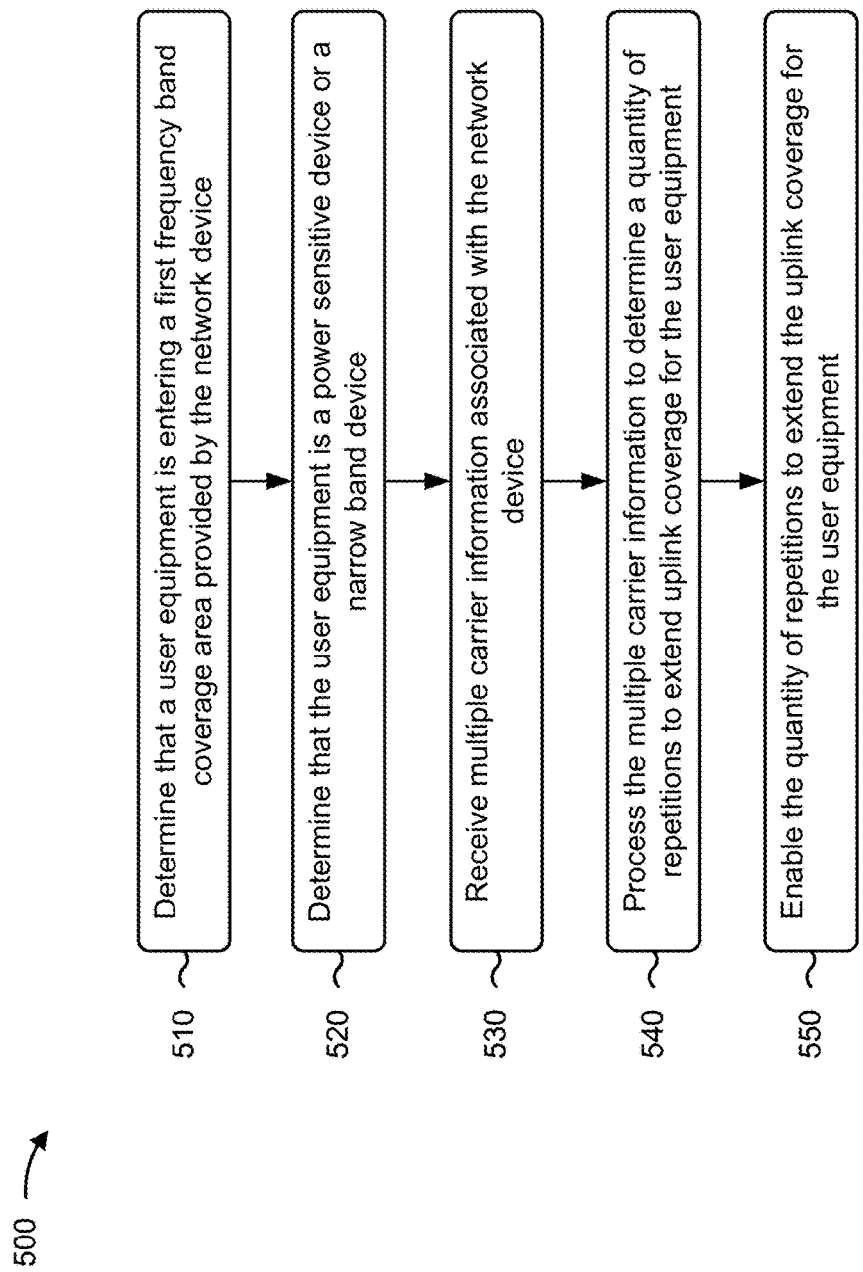
FIG. 5 is a flowchart of an example process for providing a robust single carrier RAN link for power sensitive or low data rate UEs.

FIG. 5 is a flowchart of an example process 500 for providing a robust single carrier RAN link for power sensitive or low data rate UEs. In some implementations, one or more process blocks of FIG. 5 may be performed by a network device (e.g., the RAN device 110). In some implementations, one or more process blocks of FIG. 5 may be performed by another device or a group of devices separate from or including the network device, such as a UE (e.g., the UE 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include determining that a UE is entering a first frequency band coverage area provided by the network device (block 510). For example, the network device may determine that a UE is entering a first frequency band coverage area provided by the network device, as described above. In some implementations, the first frequency band is a 3.7 gigahertz 5G frequency band. In some implementations, the network device is a RAN device. In some implementations, the first frequency band is defined by an RSRP threshold uplink and an RSRP threshold downlink. In some implementations, the UE is an IoT device.

As further shown in FIG. 5, process 500 may include determining that the UE is a power sensitive device or a narrow band device (block 520). For example, the network device may determine that the UE is a power sensitive device or a narrow band device, as described above. In some implementations, determining that the UE is a power sensitive device or a narrow band device includes receiving capability information associated with the UE, and determining that the UE is a power sensitive device or a narrow band device based on the capability information.

As further shown in FIG. 5, process 500 may include receiving multiple carrier information associated with the network device (block 530). For example, the network device may receive multiple carrier information associated with the network device based on determining that the UE is a power sensitive device or a narrow band device, as described above.

As further shown in FIG. 5, process 500 may include processing the multiple carrier information, with a machine learning model, to determine a quantity of repetitions to extend uplink coverage for the UE (block 540). For example, the network device may process the multiple carrier information, with a machine learning model, to determine a quantity of repetitions to extend uplink coverage for the UE, as described above.

As further shown in FIG. 5, process 500 may include enabling the quantity of repetitions to extend the uplink coverage for the UE (block 550). For example, the network device may enable the quantity of repetitions to extend the uplink coverage for the UE, as described above.

In some implementations, process 500 includes processing the multiple carrier information, with the machine learning model, to determine how to reduce an MCS to enhance uplink robustness for the UE, and reducing the MCS to enhance the uplink robustness for the UE based on determining how to reduce the MCS. In some implementations, process 500 includes processing the multiple carrier information, with the machine learning model, to determine how to reduce a BLER to enhance uplink robustness for the UE, and reducing the BLER to enhance the uplink robustness for the UE based on determining how to reduce the BLER.

In some implementations, process 500 includes determining that another UE is entering the first frequency band, determining that the other UE is not a power sensitive device or a narrow band device, and enabling carrier aggregation with a second frequency band and the first frequency band, for the other UE, based on determining that the other UE is not a power sensitive device or a narrow band device. In some implementations, the second frequency band is an eight hundred and fifty megahertz 5G frequency band.

In some implementations, process 500 includes determining that another UE is entering the first frequency band, determining that the other UE is not a power sensitive device or a narrow band device, and enabling dual connectivity, with a second frequency band and the first frequency band, to extend coverage of the first frequency band for the other UE based on determining that the other UE is not a power sensitive device or a narrow band device. In some implementations, the second frequency band is an eight hundred and fifty megahertz 4G frequency band.

In some implementations, process 500 includes processing the multiple carrier information, with the machine learning model, to determine a slot aggregation to extend uplink coverage for the UE, and enabling the slot aggregation to extend the uplink coverage for the UE.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a network device, that a user equipment is entering a first frequency band coverage area provided by the network device;
   determining, by the network device, that the user equipment is a power sensitive device or a narrow band device;
   receiving, by the network device, multiple carrier information associated with the network device based on determining that the user equipment is a power sensitive device or a narrow band device;
   processing, by the network device, the multiple carrier information to determine a quantity of repetitions to extend uplink coverage for the user equipment; and enabling, by the network device, the quantity of repetitions to extend the uplink coverage for the user equipment.

2. The method of claim 1, further comprising:
processing, by the network device, the multiple carrier information, with a machine learning model, to determine how to reduce a modulation coding scheme to enhance uplink robustness for the user equipment; and
reducing the modulation coding scheme to enhance the uplink robustness for the user equipment based on determining how to reduce the modulation coding scheme.

3. The method of claim 1, further comprising:
processing, by the network device, the multiple carrier information, with a machine learning model, to determine how to reduce a block error rate to enhance uplink robustness for the user equipment; and
reducing the block error rate to enhance the uplink robustness for the user equipment based on determining how to reduce the block error rate.

4. The method of claim 1, further comprising:
determining that another user equipment is entering a first frequency band associated with the first frequency band coverage area;
determining that the other user equipment is not a power sensitive device or a narrow band device; and
enabling carrier aggregation with a second frequency band and the first frequency band, for the other user equipment, based on determining that the other user equipment is not a power sensitive device or a narrow band device.

5. The method of claim 4, wherein the second frequency band is about an 800-900 megahertz frequency band.

6. The method of claim 1, further comprising:
determining that another user equipment is entering a first frequency band associated with the first frequency band coverage area;
determining that the other user equipment is not a power sensitive device or a narrow band device; and
enabling dual connectivity, with a second frequency band and the first frequency band, to extend coverage of the first frequency band for the other user equipment based on determining that the other user equipment is not a power sensitive device or a narrow band device.

7. The method of claim 6, wherein the second frequency band is about an 800-900 megahertz fourth-generation frequency band.

8. A network device, comprising:
one or more processors configured to:
determine that a user equipment is entering a first frequency band coverage area provided by the network device;
determine that the user equipment is a power sensitive device or a narrow band device;
receive multiple carrier information associated with the network device based on determining that the user equipment is a power sensitive device or a narrow band device;
process the multiple carrier information to determine a quantity of repetitions to extend uplink coverage for the user equipment and to determine how to reduce a modulation coding scheme to enhance uplink robustness for the user equipment;
enable the quantity of repetitions to extend the uplink coverage for the user equipment; and
reduce the modulation coding scheme to enhance the uplink robustness for the user equipment based on determining how to reduce the modulation coding scheme.

9. The network device of claim 8, wherein a first frequency band is about a 3300-4200 gigahertz frequency band.

10. The network device of claim 8, wherein the network device is a radio access network device.

11. The network device of claim 8, wherein a first frequency band is defined by a reference signal received power (RSRP) threshold uplink and an RSRP threshold downlink.

12. The network device of claim 8, wherein the user equipment is an Internet of Things device.

13. The network device of claim 8, wherein the one or more processors are further configured to:
process the multiple carrier information, with a machine learning model, to determine a slot aggregation to extend uplink coverage for the user equipment; and
enable the slot aggregation to extend the uplink coverage for the user equipment.

14. The network device of claim 8, wherein the one or more processors, to determine that the user equipment is a power sensitive device or a narrow band device, are configured to:
receive capability information associated with the user equipment; and
determine that the user equipment is a power sensitive device or a narrow band device based on the capability information.

15. A non-transitory computer-readable medium storing a set of instructions, the set of instructions comprising:
one or more instructions that, when executed by one or more processors of a network device, cause the network device to:
determine that a user equipment is entering a first frequency band coverage area provided by the network device;
determine that the user equipment is a power sensitive device or a narrow band device;
receive multiple carrier information associated with the network device based on determining that the user equipment is a power sensitive device or a narrow band device;
process the multiple carrier information, with a machine learning model, to determine a quantity of repetitions to extend uplink coverage for the user equipment and to determine how to reduce a block error rate to enhance uplink robustness for the user equipment;
enable the quantity of repetitions to extend the uplink coverage for the user equipment; and
reduce the block error rate to enhance the uplink robustness for the user equipment based on determining how to reduce the block error rate.

16. The non-transitory computer-readable medium of claim 15, wherein the one or more instructions further cause the network device to:
process the multiple carrier information, with the machine learning model, to determine how to reduce a modulation coding scheme to enhance uplink robustness for the user equipment; and
reduce the modulation coding scheme to enhance the uplink robustness for the user equipment based on determining how to reduce the modulation coding scheme.

17. The non-transitory computer-readable medium of claim 15, wherein the one or more instructions further cause the network device to:
- determine that another user equipment is entering a first frequency band associated with the first frequency band coverage area;
- determine that the other user equipment is not a power sensitive device or a narrow band device; and
- enable carrier aggregation with a second frequency band and the first frequency band, for the other user equipment, based on determining that the other user equipment is not a power sensitive device or a narrow band device.

18. The non-transitory computer-readable medium of claim 17, wherein the second frequency band is an eight hundred and fifty megahertz fifth-generation frequency band.

19. The non-transitory computer-readable medium of claim 15, wherein the one or more instructions further cause the network device to:
- determine that another user equipment is entering a first frequency band associated with the first frequency band coverage area;
- determine that the other user equipment is not a power sensitive device or a narrow band device; and
- enable dual connectivity, with a second frequency band and the first frequency band, to extend coverage of the first frequency band for the other user equipment based on determining that the other user equipment is not a power sensitive device or a narrow band device.

20. The non-transitory computer-readable medium of claim 19, wherein the second frequency band is an eight hundred and fifty megahertz fourth-generation frequency band.

* * * * *